United States Patent
Kim

(10) Patent No.: US 8,012,904 B2
(45) Date of Patent: Sep. 6, 2011

(54) ACID RESISTANT CERAMIC MATERIALS, FILTER USING THE SAME, AND PREPARATION OF THEM

(75) Inventor: Young Nam Kim, Gangwon (KR)

(73) Assignee: KH Chemicals Co., Ltd., Gangnung-shi, Gangwon (KR)

(*) Notice: Subject to any disclaimer, the term of this patent is extended or adjusted under 35 U.S.C. 154(b) by 0 days.

(21) Appl. No.: 11/817,932

(22) PCT Filed: Mar. 7, 2006

(86) PCT No.: PCT/KR2006/000783
§ 371 (c)(1),
(2), (4) Date: May 19, 2009

(87) PCT Pub. No.: WO2006/095992
PCT Pub. Date: Sep. 14, 2006

(65) Prior Publication Data
US 2009/0270252 A1 Oct. 29, 2009

(30) Foreign Application Priority Data

Mar. 7, 2005 (KR) .................. 10-2005-0018739

(51) Int. Cl.
*C04B 35/18* (2006.01)
*B01J 23/40* (2006.01)
(52) U.S. Cl. ............ 502/325; 55/523; 428/116; 501/80; 502/339; 502/527.11
(58) Field of Classification Search .................. 502/300, 502/305, 308, 309, 311, 313, 314, 319, 321, 502/332, 349, 350, 339, 527.11; 55/523; 428/116; 501/80
See application file for complete search history.

(56) References Cited

U.S. PATENT DOCUMENTS

| | | | |
|---|---|---|---|
| 3,940,255 A | 2/1976 | Harrington et al. | |
| 3,954,672 A | 5/1976 | Somers et al. | |
| 4,042,403 A * | 8/1977 | Reade | 501/7 |
| 4,132,669 A * | 1/1979 | Choca et al. | 502/208 |
| 4,528,275 A | 7/1985 | Hodge et al. | |
| 4,921,616 A * | 5/1990 | Minjolle | 210/767 |
| 4,950,628 A | 8/1990 | Landon et al. | |
| 6,256,984 B1 * | 7/2001 | Voss et al. | 60/299 |
| 6,300,262 B1 * | 10/2001 | Beall | 501/5 |
| 6,534,207 B2 | 3/2003 | Kubota et al. | |
| 6,813,903 B2 | 11/2004 | Beall et al. | |
| 6,833,105 B2 | 12/2004 | Beauvent et al. | |
| 6,858,555 B2 * | 2/2005 | Shibasaki et al. | 502/64 |
| 2003/0007925 A1 | 1/2003 | Khan et al. | |
| 2003/0104932 A1 * | 6/2003 | Kim | 502/216 |

FOREIGN PATENT DOCUMENTS

WO WO03/078352 9/2003
WO WO2004/011124 2/2004

OTHER PUBLICATIONS

Kato et al., "Highly active silica-alumina-titania catalyst for photoinduced non-oxidative methane coupling", (2002), Catalysts Communications, vol. 3, p. 99-103.*
Liang et al., "preparation of mullite/zirconia composite ceramics with ultra fine grains by in-situ controlled crystallizing from the Si-Al-Zr-O amorphous bulk", (Mar. 2006), vol. 11 No. 1, p. 32-37.*
Lin et al. "Characterization of CeO2-Al2O3-SiO2 glasses by infrared and x-ray absorption near edge structure spectroscopes" Oct. 1996, Journal of materials reasearch, vol. 11, No. 10 p. 2641-2650.*
Montanaro, L., et al. "Influence of Some Pollutants on the Durability of Cordierite Filters for Diesel Cars," *Ceramics International*, 1994, pp. 169-174, vol. 20, Elsevier Science Limited, England.
Montanaro, L., et al. "Deterioration of Cordierite Honeycomb Structure for Diesel Emissions Control," *Journal of the European Ceramic Society*, 1994, pp. 129-134, vol. 13, Elsevier Science Limited, England.
*Ex Parte Khan et al.*, Appeal No. 2007-010 (BPAI May 15, 2007).
*Kolmes v. World Fibers Corp.*, 107 F.3d 1534 (Fed. Cir. 1997).
In re Wertheim, 541 F.2d 257, 191 USPQ 90 (CCPA 1976).
PCT International Search Report for PCT Counterpart Application No. PCT/KR2006/000783, 2 pgs (Jun. 12, 2006).
Written Opinion of the International Search Authority for PCT Counterpart Application No. PCT/KR2006/000783, 3 pgs (Jun. 12, 2006).

* cited by examiner

*Primary Examiner* — Wayne Langel
*Assistant Examiner* — Syed Iqbal
(74) *Attorney, Agent, or Firm* — Blakely, Sokoloff, Taylor & Zafman LLP

(57) ABSTRACT

The present invention provides porous ceramic materials having good resistance to heat, acid and base, comprising three or more oxides selected from an oxide of silicon (SiO), an oxide of aluminum (AlO), an oxide of a transition metal, MxOy, [wherein M represents a 4B, 5B or 6B-group transition metal which can be selected from Ti, Zr, Hf, V, Nb, Ta, Cr, Mo, W or Ce, x represents an integer of 1 to 3, and y represents an integer of 1 to 3] and its preparation. By applying ceramic materials prepared according to the present invention that are structurally, thermally and chemically stable to a porous honeycomb support for the purification of exhaust gas or to a filter (DPF, Diesel Particulate Filter) for the purification of diesel engine exhaust gas, it is possible to prevent or remarkably reduce any structural destruction caused by corrosive gas, which results from employing a cordierite material as a structural support.

10 Claims, No Drawings

ACID RESISTANT CERAMIC MATERIALS, FILTER USING THE SAME, AND PREPARATION OF THEM

CROSS-REFERENCE TO OTHER APPLICATIONS

This is a National Phase of International Application No. PCT/KR2006/000783, filed on Mar. 7, 2006, which claims priority from Korean Patent Application No. 10-2005-0018739, filed on Mar. 7, 2005.

TECHNICAL FIELD

The present invention relates to ceramic materials having excellent resistance to heat, acid and base, a filter using the ceramic materials, and a process for the preparation thereof.

As materials for a catalyst carrier or filter system operating at a high temperature such as a carrier of a catalyst for the purification of automobile exhaust gas, a heat exchanger of a gas turbine, a filtering system for the purification of diesel automobile exhaust gas (DPF, diesel particulate filter) or the like, mullite having the composition of $2SiO_2$-$3Al_2O_3$ and cordierite having the composition of $2MgO$-$2Al_2O_3$-$5SiO_2$ are widely used due to their excellent thermal properties such as a low thermal expansion coefficient ($1\sim5\times10^{-6}$/K), thermal conductivity, dielectric constant or the like as well as their chemically stable feature.

However, there are some problems that mullite is rarely found in nature and can be obtained only via a synthetic route and that cordierite is difficult to prepare in the form of a fine powder with high purity since the range of synthetic temperature thereof is narrow. Moreover, although they have excellent thermal properties, the application to structural material has been restricted owing to their low mechanical strength.

BACKGROUND ART

Hitherto, a number of studies have been conducted to develop and easily produce a ceramic filter having excellent thermal and chemical properties and composed of cordierite or mullite as a main crystalline phase.

Arthur, et al. described in U.S. Pat. No. 3,954,672 a synthesis of cordierite by use of talc, clay, kyanite, alumina and water and the use thereof as materials for a catalyst carrier, turbine engine, heat exchanger or furnace that is not thermally transformable. In said patent, it is highlighted that the contents of $Na_2O$ or $K_2O$ should be less than 0.14%.

U.S. Pat. No. 3,940,255 (Roy, et al.) describes the use of small amount of Mo, Ta, Zr, Nb, Ti, Li, As, etc. as a nucleating agent to better embody the crystalline structure of cordierite. In said patent, metal oxides such as Mo, Ta, Zr, Nb, Ti, Li, As, etc. are not structural components, but additional components, which are added with a very small amount, i.e., 0.5-3%, where a thermal expansion coefficient of the cordierite synthesized therein is restricted to less than $1.54\times10^{-6}$/K.

U.S. Pat. No. 4,042,403 (Richard, et al.) describes a synthesis of cordierite structure by using 3-5% of $Li_2O$, 0.25-2.5% of MgO, 15-20% of $Al_2O_3$, 68-75% of $SiO_2$ and 2-5.5% of $TiO_2$. The structure of cordierite produced in said patent is proved to be thermally stable and shows 100 ppm or less of change in length when operated for 2000 hours at 950° C.

U.S. Pat. No. 4,528,275 (James, et al.) describes a multi-crystalline body consisting of 50-95% of mullite and 5-50% of cordierite. Said patent discloses, as a method for lowering a thermal expansion coefficient with maintaining the properties of mullite, a synthesis of materials whose thermal expansion coefficients are generally lower than a pure mullite by adding cordierite in the presence of $TiO_2$ as a nucleating agent.

U.S. Pat. No. 4,921,616 (Louis, et al.) describes a preparation of mullite/zirconia composite having an excellent thermal resistance from $SiO_2$, $Al_2O_3$ and $ZrO_2$, and shows that a filter produced from such mullite/zirconia composite is durable even at a temperature of 1650° C. and thus can be used as a filter of melted metal, whereas a conventional single cordierite or a cordierite/mullite composite cannot be used at a high temperature higher than 1500° C.

U.S. Pat. No. 4,950,628 (Thomas, et al.) describes a synthesis of cordierite having a very low thermal expansion coefficient ($7\times10^{-6}$/K) by adding talc, kaolin, aluminum oxide, amorphous silica or the like to a $SiO_2$—$Al_2O_3$—$MgO$ precursor mixture for the preparation of cordierite. The cordierite synthesized as above is reported to be an excellent material in terms of thermal shock as well as thermal expansion coefficient.

However, cordierite having the composition of $2MgO$-$2Al_2O_3$-$5SiO_2$ is vulnerable to acid and base owing to the MgO component. Since MgO forms a crystalline structure together with $Al_2O_3$ and $SiO_2$, it has some resistance to acid and base. However, when exposed to sulfur dioxide gas contained in automobile exhaust gas for an extended period of time, MgO transforms into $MgSO_4$, which may weaken the overall structure of cordierite owing to $MgSO_4$'s weak strength. Therefore, in a catalyst system for the purification of automobile exhaust gas wherein heating and cooling repetitively occur and which is exposed to sulfur dioxide gas for an extended period of time, it is difficult to prevent a catalyst carrier comprising cordierite from the deterioration in strength and structure. Such problems cannot be overcome unless one or more components constituting cordierite ceramics is or are changed or substituted.

Therefore, it has been required in the art to develop a catalyst carrier or a filter material which is strongly resistant to acid and base with maintaining its excellent thermal properties. Further, said catalyst carrier or a filter material should be structurally stable and have durability in the gas containing acids or bases and its structure should be not weakened or destructed even after a long operation.

In order to produce the ceramic structure which is strong against acid and base, each component constituting the ceramic structure should have low reactivity with or high resistance to acids and bases. This is because, even if each oxide of components is crystallized or synthesized at a temperature higher than its melting point so as to form a material such as a composite oxide, the inherent chemical characteristics of each oxide do not disappear, and as a result, the strength of the overall structure of composite structure may be weakened.

DISCLOSURE OF INVENTION

Technical Problem

The present invention aims at synthesizing ceramic materials having thermal and chemical stability which can be achieved from the overall structural stability and from the combination of each component, by substituting the components constituting the synthetic ceramics such as mullite or cordierite with other components having strong corrosion-resistance to acid and base or simply by adding such other materials.

The present invention further aims at producing a porous honeycomb or a filter for the purification of exhaust gas in which any structural destruction caused by corrosive gas resulting from employing a cordierite material as a structural support is remarkably prevented or reduced, by applying ceramic materials having high structural, thermal and chemical stability, which is prepared according to the present invention, to a porous honeycomb support for the purification of exhaust gas or to a filter for the purification of diesel engine exhaust gas (DPF, Diesel Particulate Filter).

Technical Solution

An object of the present invention is to provide porous ceramic materials having good resistance to heat, acid and base, comprising more than three oxides selected from an oxide of silicon ($SiO_2$), an oxide of aluminum ($Al_2O_3$), an oxide of a transition metal of MxOy [wherein M represents a 4B, 5B or 6B-group transition metal which can be selected from Ti, Zr, Hf, V, Nb, Ta, Cr, Mo, W or Ce, x represents an integer of 1 to 3, and y represents an integer of 1 to 3], and a process for the preparation thereof.

According to a first preferred embodiment, the present invention provides porous ceramic materials comprising, as (First component)-(Second component)-(Third component), $SiO_2$—$Al_2O_3$-MxOy [wherein M represents a 4B, 5B or 6B-group transition metal which can be selected from Ti, Zr, Hf, V, Nb, Ta, Cr, Mo, W or Ce, x represents an integer of 1 to 3, and y represents an integer of 1 to 3] in the weight ratio of (5-60):(5-60):(5-60), preferably, (10-50):(10-50):(10-50), and a process for the preparation thereof.

According to a second preferred embodiment, the present invention provides porous ceramic materials comprising, as (First component)-(Second component)-(Third component), $TiO_2$—$ZrO_2$-MxOy [wherein M represents Si, Al, or a 4B, 5B or 6B-group transition metal which can be selected from Hf, V, Nb, Ta, Cr, Mo, W or Ce, x represents an integer of 1 to 3, and y represents an integer of 1 to 3] in the weight ratio of (5-60):(5-60):(5-60), preferably, (10-50):(10-50):(10-50), and a process for the preparation thereof.

Another object of the present invention is to provide a porous honeycomb or a filter for the purification of diesel engine exhaust gas (DPF, Diesel Particulate Filter) produced by use of the above-described porous ceramic materials having excellent resistance to heat, acid and base.

A further object of the present invention is to provide a system for the purification of exhaust gas, which is manufactured by wash coating a porous carrier powder comprising a catalytic material such as platinum, palladium or rhodium onto the above-described porous ceramic materials having good resistance to heat, acid and base.

A further object of the present invention is to provide a system for the purification of exhaust gas, which is manufactured by directly loading a solution comprising a catalytic material such as platinum, palladium or rhodium onto the above-described porous ceramic materials having good resistance to heat, acid and base.

In the following, the present invention will be described in detail and the above-described purposes and other purposes of the present invention will be more clearly understood from the below detailed description.

Generally, metals are thermally more stable in the sulfate form than in the oxide form, and this phenomenon predominantly appears in alkali metals and alkaline earth-metals. For example, an oxide or carbonate of calcium (CaO or $Ca(CO_3)_2$) easily reacts with sulfur dioxide gas to form calcium sulfate ($CaSO_4$) which is thermally more stable. By using such feature, CaO or $Ca(CO_3)_2$ is used as a scavenger of $SO_2$ gas which is exhausted from a thermal power plant. Similarly, in case of magnesium, its sulfate form ($MgSO_4$) is thermally more stable than its oxide form (MgO). Therefore, when cordierite containing MgO is employed as a catalyst carrier for the purification of automobile exhaust gas, sulfur dioxide ($SO_2$) gas contained in the exhaust gas reacts with MgO to change into $MgSO_4$, which is the main reason that the overall structure of cordierite weakens or is destructed.

4B-, 5B- and 6B-group transition metal oxides have much stronger resistance to acid and base than the other transition metal oxides, and seldom react with sulfur dioxide or sulfate ion. Even if a 4B-, 5B- and 6B-group transition metal form a sulfate form of the metal, it has a structure of metal-O—$SO_3$ in which an oxygen atom interposes between the metal atom and the sulfate ion and thus can easily decompose by heat or water to return to the metal oxide.

If a ceramic material is produced by using such 4B-, 5B- and 6B-group transition metal oxides together with silica ($SiO_2$) and alumina ($Al_2O_3$) as structural components, the surface of ceramic structure may transform into a sulfate when it is exposed to $SO_2$ gas and reacted with sulfate ion. However, since the metal oxides having low reactivity with $SO_2$ gas form a crystalline phase, the inside of ceramic structure cannot easily react with $SO_2$ gas. Therefore, it is possible to produce a catalyst carrier or a filter whose structure is stable even in the presence of $SO_2$ gas.

In addition, 4B-, 5B- and 6B-group transition metal oxides are thermally more stable than the other transition metal oxides due to their remarkably high melting points, and thus can provide the structure having even better thermal resistance.

Therefore, ceramic materials according to the present invention comprising 4B-, 5B- and 6B-group transition metal oxides exhibit excellent chemical stability due to a strong resistance to acid and base; and thus, ceramics having excellent thermal stability can by synthesized.

In the sense of the present invention, a 4B-, 5B- and 6B-group transition metal means an element included in 4B-, 5B- and 6B-group metals in the periodic table of elements. Specifically, mention can be made of Ti, Zr, Hf, V, Nb, Ta, Cr, Mo, W or Ce, which are not the restricted examples. For example, cerium (Ce) is a lanthanide transition metal, but is mentioned in the present invention together with 4B-, 5B- and 6B-group transition metals. Likewise, other transition metals which are not included in 4B-, 5B- and 6B-group having strong resistance to acid and base can be employed in the present invention.

Meanwhile, ceramic materials synthesized as above can produce good results such as enhanced durability when it is employed as materials for a porous filter for collecting and removing soot or for a catalyst carrier for the purification of gasoline engine or diesel engine exhaust gas containing a great quantity of corrosive gas.

Particularly, since the DPF (diesel particulate filter) system for collecting and treating soot containing in diesel engine exhaust gas operates in a wall-flow way wherein the exhaust gas passes through a porous wall and any particulates contained in the exhaust gas are caught, a ceramic filter of the DPF system is more frequently and extensively exposed to sulfur dioxide gas. In this regard, since the structure of conventional ceramic filter materials such as cordierite is easily crushed by sulfur dioxide gas, it is preferable to use ceramic materials according to the present invention having high resistance to acid and base. Therefore, new ceramic materials as suggested in the present invention are much more efficient in producing a filter for the purification of diesel engine exhaust gas in which a great quantity of sulfur dioxide gas is contained.

The ceramic materials according to the present invention can comprise a first component, a second component and a third component in the weight ratio of (5-60):(5-60):(5-60), preferably (10-50):(10-50):(10-50).

According to a first preferred embodiment of the present invention, the ceramic materials according to the present invention comprise, as (First component)-(Second component)-(Third component), $SiO_2$—$Al_2$-MxOy [wherein M represents a 4B, 5B or 6B-group transition metal which can be selected from Ti, Zr, Hf, V, Nb, Ta, Cr, Mo, W or Ce, x represents an integer of 1 to 3, and y represents an integer of 1 to 3] in the weight ratio of (5-60):(5-60):(5-60), preferably, (10-50):(10-50):(10-50) in which the first component is silica, the second component is alumina and the third component is an oxide of a transition metal included in 4B-, 5B- and 6B-group (e.g., Ti, Zr, Hf, V, Nb, Ta, Cr, Mo, W) or Ce.

Preferably, silica (first component)/alumina (second component)/transition metal oxide (third component) can be contained in the weight ratio of 10-30/30-60/5-60.

The staring materials, silica and alumina can constitute the structure of mullite ($3Al_2O_3 2SiO_2$), and in such case, they can be mixed with a third component in the weight ratio of 60-95/5-40.

According to a second preferred embodiment of the present invention, the ceramic materials according to the present invention comprise, as (First component)-(Second component)-(Third component), $TiO_2$—$ZrO_2$-MxOy [wherein M represents Si, Al, or a 4B, 5B or 6B-group transition metal which can be selected from Hf, V, Nb, Ta, Cr, Mo, W or Ce, x represents an integer of 1 to 3, and y represents an integer of 1 to 3] in the weight ratio of (5-60):(5-60):(5-60), preferably, (10-50):(10-50):(10-50), wherein the first component is titania, the second component is zirconia and the third component is a 4B-, 5B-, and 6-B transition metal oxide selected from Hf, V, Nb, Ta, Cr, Mo, W or Ce, or at least one oxide selected from silica or alumina. Preferably, the aforesaid titania-zirconia ($TiO_2$—$ZrO_2$) may constitute a homogeneous mixture in an atomic level to form a composite oxide $TiZrO_4$.

According to another preferred example of the present invention, the porous ceramic materials of the present invention comprise a composite oxide of $TiO_2$—$ZrO_2$—$Al_2O_3$, of $TiO_2$—$ZrO_2$—$WO_3$ or of $TiO_2$—$ZrO_2$—$SiO_2$ in the weight ratio of (5-60):(5-60):(5-60), preferably, (10-50):(10-50):(10-50).

The porous ceramic materials according to the present invention may comprise a fourth component, M'xOy, [wherein M' differs from the first component, second component and third component and represents a 4B-, 5B- or 6B-group transition metal selected from Ti, Zr, Hf, V, Nb, Ta, Cr, Mo, W or Ce, or Si, Al, x represents an integer of 1 to 3, and y represents an integer of 1 to 3] in the weight ratio of (First component)-(Second component)-(Third component)-(Forth component)=(5-60):(5-60):(5-60):(5-60), preferably, (10-50):(10-50):(10-50):(10-50).

For example, the porous ceramics comprising a composite oxide of $TiO_2$—$ZrO_2$—$SiO_2$ produced according to the present invention can comprise, as a fourth component, an oxide of a 4B-, 5B- or 6B-group transition metal (e.g., Hf, V, Nb, Ta, Cr, Mo, W) or Ce, or at least one oxide selected from a group consisting of alumina in the aforesaid weight ratio.

In the present invention, the content of each component is not critical and is not particularly strict because the content change of each component does not significantly affect the structure or performance of the composite, but merely alters the properties of ceramic composite. In this regard, the present invention does not intend to produce a composite in which every component is synthesized stably in a single phase, but intends to obtain the overall structural stability of ceramic composite since two or more components constitute stable compound(s) to make a stable form and such stable forms are combined together with each other to constitute said overall ceramic composite.

For example, when synthesizing a ceramic composite by using four components including $TiO_2$—$ZrO_2$—$SiO_2$—$Al_2O_3$, the structures of $TiO_2$—$ZrO_2$, $TiO_2$—$Al_2O_3$, mullite ($3Al_2O_3$-$2SiO_2$), $Al_2TiO_5$ and the like can be found by an XRD (X-ray diffraction) analysis of the structure of ceramic composite. In this manner, the components of the ceramic composite prepared according to the present invention do not form a single phase all together; but two or three components constitute chemically stable phases and these stable phases combine with each other to constitute micro-sized grains in an atomic level. And then, said micro-sized grains are complexly combined to constitute even more complicated and various composite particles and such particles eventually constitute an overall composite that is thermally, mechanically and chemically stable.

Advantageous Effects

In addition to the advantages as mentioned above, the present invention has the following merits and advantages:

Since the conventional cordierite or silicone carbide forms generally one stable phase that is a single phase, it forms ceramics which is thermally and structurally stable. A slight change of contents of materials formed in a single phase may cause a sudden change in its phase and physical properties. In contrast, the composite in which various components form diverse phases and such diverse phases are combined to constitute an overall stable phase, as in the composite ceramic materials according to the present invention, has a merit that a content change of each component can maximize any desired or elected properties without regard to the phase change.

In summary, a change in contents of the components may cause a sudden fluctuation in the physical properties such as strength, thermal expansion coefficient, etc., but does not significantly affect the overall structural stability. Therefore, a ceramic composite formed in multi-phases has little restriction to the content of its components. Further, if a desired or elected property can be maximized, it is possible to increase the content of a component without regard to the phase change.

When a ceramic composite is synthesized, its structural stability can be easily expected without various working examples in various compositions of the components. Thus, as long as the purport accords with that of the present invention, the contents of the components can be increased or decreased as needed regardless of the phase change.

In addition, the present invention is not restricted by the above-mentioned components such as silica, alumina or transition metal oxides, and their composition ratios. Further, the type and the composition of metal oxides are not specifically restricted and can be optionally selected as long as they are resistant to acid and base and can be used in the synthesis of ceramic materials.

The process for the preparation of the ceramic materials according to the present invention is not particularly restricted and any conventionally known processes can be employed. For example, processes described in U.S. Pat. No. 3,954,672, U.S. Pat. No. 3,940,255, U.S. Pat. No. 4,042,403, U.S. Pat. No. 4,528,275, U.S. Pat. No. 4,921,616, and U.S. Pat. No. 4,950,628 can be used. If necessary, preparations of cordierite or mullite according to any particular reaction procedure and conditions do not deviate the scope of the present invention According to the present invention, a porous honeycomb is provided, which is well resistant to heat, acid and base and is produced by use of ceramic materials prepared in accordance with the aforementioned process. The porous honeycomb according to the present invention can preferably be used as a honeycomb of 3-way catalyst system for the purification of gasoline engine exhaust gas and as a honeycomb of catalyst system for the purification of diesel engine exhaust gas. In particular, it can be used as DPF (Diesel Particulate Filter), a system for collecting and removing soot comprised in the diesel engine exhaust gas.

In the present invention, the term a catalyst carrier (or a carrier of catalyst) refers to a porous material in which catalytic metals or elements such as Pt, Pd, Rh, etc. are loaded or supported.

Meanwhile, most of $SiO_2$, $Al_2O_3$, and the third components (a 4B-, 5B- or 6B-group transition metal oxides) or Ce used in the present invention are also used as a carrier of catalyst (Pt, Pd, Rh) for the purification of gasoline engine exhaust gas and a carrier of catalyst (Pt, Pd, Rh) for the purification of diesel engine exhaust gas.

One of the advantages of the present invention is that the present invention is capable of producing a catalytic system for the purification of exhaust gas via directly loading by spraying or soaking catalytic materials such as Pt, Pd, Rh in a solution state onto a filter, after preparing the ceramic materials according to the present invention in the form of a porous ceramic filter such as a DPF, thereby making the filter directly load the catalytic materials. In a filter system for the purification of diesel engine exhaust gas produced as above, pore blocking or adhesion of filter materials with the catalyst carrier does not occur, since the catalytic metals loaded on a carrier are wash-coated on a honeycomb or DPF. Thus, the present invention can produce a much more efficient and economical catalytic filter system.

BEST MODE FOR CARRYING OUT THE INVENTION

The present invention will be more specifically described hereinafter with reference to examples. However, the present invention is not restricted to the examples below.

Example 1

A composite ceramic structure having the composition ratio of $3Al_2O_3$-$2SiO_2$-$3TiO_2$ was prepared. Starting materials were alumina ($Al_2O_3$), silica ($SiO_2$) and titania ($TiO_2$). Starting materials were weighed, introduced in a mixer and mixed for 30 minutes or more with using acetone as a mixing solution. Thus prepared mixed powder was processed in the form of disk. The resulted disk was heat-treated for 2 hours at 1500° C. In an XRD (X-ray diffraction) analysis, the structure of mullite ($3Al_2O_3$—$2SiO_2$) and the crystal structure ($TiO_2$—$Al_2O_3$) have been observed. The composite ceramic structure of $3Al_2O_3$—$2SiO_2$—$3TiO_2$ synthesized as above shows the thermal expansion co-efficient of $6.2 \times 10^{-6}$/K at a temperature of 0~800° C.

Example 2

A composite ceramic structure having the composition ratio of $2Al_2O_3$—$TiO_2$—$ZrO_2$ was prepared. Starting materials were alumina ($Al_2O_3$), zirconia ($ZrO_2$) and titania ($TiO_2$). Starting materials were weighed, introduced in a mixer and mixed for 30 minutes or more with using acetone as a mixing solution. Thus prepared mixed powder was processed in the form of disk. The resulted disk was heat-treated for 2 hours at 1450° C. In an XRD analysis, the structure of $TiZrO_4$ and the crystal structure of $Al_2TiO_5$ have been observed. The composite ceramic structure of $2Al_2O_3$—$TiO_2$—$ZrO_2$ synthesized as above shows the thermal expansion coefficient of $7.1 \times 10^{-6}$/K at a temperature of 0~800° C.

Example 3

A composite ceramic structure having the composition ratio of $WO_3$—$3TiO_2$—$3ZrO_2$ was prepared. Starting materials were tungsten oxide ($WO_3$), zirconia ($ZrO_2$) and titania ($TiO_2$). Starting materials were weighed, introduced in a mixer and mixed for 30 minutes or more with using acetone as a mixing solution. Thus prepared mixed powder was processed in the form of disk. The resulted disk was heat-treated for 2 hours at 1100° C. In an XRD analysis, the structure of $TiZrO_4$ has been observed. The composite ceramic structure of $WO_3$—$3TiO_2$—$3ZrO_4$ synthesized as above shows the thermal expansion coefficient of $7.5 \times 10^{-6}$/K at a temperature of 0~800° C.

Example 4

A composite ceramic structure according to the present invention was produced by using a composite oxide $TiZrO_4$ as a basic material and a transition metal oxide as a third component. First, $TiO_2$ and $ZrO_2$ in the ratio of 1:1 (atomic ratio of Ti and Zr) were weighed, introduced in a mixer and mixed for 6 hours or more with using ethanol as a mixing solution. The resulted mixed powder was dried for 10 hours and subjected to an oxidation treatment at 1100° C. to remove impurities. The resulted powder was introduced in a mixer and mixed for 6 hours with using ethanol as a mixing solution and adding 5% of PVA (polyvinyl alcohol) as a binder. Thus prepared mixed powder was introduced in a mold, shaped, and processed in the form of disk. The resulted disk was heat-treated for 2 hours at 1300~1500° C. In an XRD analysis, the crystal structure of $TiO_2$—$ZrO_2$ has been observed.

The composite oxide $TiZrO_4$ synthesized as above was ground to a powder, which was used as a basic material to produce a new ceramic composite material by adding third metal oxide ($Al_2O_3$, $MoO_2$, $CrO_2$, $VO_2$, $Nb_2O_5$, $SiO_2$ and/or $CeO_2$) in an amount of 5~20% and subjected to the above processes: mixing→drying→oxidation→mixing (adding a binder)→shaping→heat-treating at a temperature of 1100~1500° C. depending on the kind of metal oxides. A phase formation in the prepared ceramic materials has been confirmed in an XRD analysis and a thermal expansion coefficient, fracture strength, thermal conductivity, etc. were determined. The results of such determination are shown in Table 1 below.

As shown in Table 1, the addition of alumina ($Al_2O_3$) results in the enhancement of both of the strength and the thermal expansion coefficient, and the addition of any one of silica ($SiO_2$), chrome oxide ($Cr_2O_3$) or molybdenum oxide ($MoO_2$) results in the enhancement of the thermal expansion coefficient. In particular, it is confirmed that the higher the content of silica is, the better the fracture strength and the thermal expansion coefficient are.

Example 5

Phase formation was carried out by using TiZr—Si(10) (a synthetic ceramic in which 10 wt. % of silica is contained in TiZrO$_4$) as a basic material and adding 5 wt. % and 10 wt. % of alumina (Al$_2$O$_3$) to increase the strength of TiZr—Si(10).

At first, TiZr—Si(10) was prepared according to the phase formation procedure described in Example 4. The resulted TiZr—Si(10) powder and alumina (Al$_2$O$_3$) powder were weighed and then subjected to the above processes: mixing→drying→oxidation→mixing (adding a binder) →shaping→heat-treating as in Example 4 to synthesize TiZr—Si(10)-Al(5) (a synthetic ceramic in which 10 wt. % of silica and 5 wt. % of alumina are contained in TiZrO$_4$) and TiZr—Si(10)-Al(10) (a synthetic ceramic in which 10 wt. % of silica and 10 wt. % of alumina are contained in TiZrO$_4$). In an XRD analysis, the structures of TiO$_2$—ZrO$_2$, TiO$_2$—Al$_2$O$_3$ mullite (3Al$_2$O$_3$—2SiO$_2$), and Al$_2$TiO$_5$ have been confirmed.

The physical properties of the above-obtained synthetic ceramics are also shown in Table 1 below.

As shown in Table 1, it can be known that the fracture strength is 5.4 Mpa for TiZr—Si(10)-Al(5) and 5.8 Mpa for TiZr—Si(10)-Al(10), which is remarkably increased in comparison to the fracture strength of 1.4 Mpa for TiZr—Si(10), and the thermal conductivity is also increased.

TABLE 1

Values of the physical properties of synthetic ceramics comprising TiZrO$_4$

| Ceramic samples | Thermal expansion coefficient (10$^{-6}$/K) | Fracture strength (Mpa) | Thermal conductivity (W/m · K) |
|---|---|---|---|
| TiZr* | 9.3 | 2.4 | 0.48 |
| TiZr—Al(5)** | 8.1 | 6.6 | 0.75 |
| TiZr—Al(10) | 7.6 | 7.7 | 0.72 |
| TiZr—Mo(5) | 8.5 | 0.9 | 0.39 |
| TiZr—Mo(10) | 8.5 | 1.2 | 0.44 |
| TiZr—Mo(20) | 8.3 | 2.8 | 0.48 |
| TiZr—Cr(5) | 6.4 | — | 0.61 |
| TiZr—Cr(10) | 9.4 | — | 0.74 |
| TiZr—V(10) | 10.2 | 1.5 | — |
| TiZr—Nb(5) | 11.4 | 1.2 | 1.44 |
| TiZr—Nb(10) | 11.3 | 1.9 | 1.74 |
| TiZr—Si(5) | 5.4 | 0.8 | — |
| TiZr—Si(10) | 4.7 | 1.4 | — |
| TiZr—Ce(10) | 8.7 | — | — |

Note)
TiZr* Composite oxide of TiZrO$_4$
TiZr—Al(5)** A composite oxide of TiZrO$_4$ containing Al$_2$O$_3$ in an amount of 5 wt. % (The metal abbreviation behind TiZr means the kind of metal contained in the TiZr composite oxide and the number behind the metal abbreviation means its content).

The objects to be obtained in the present invention don't represent a single crystalline phase, but they represent and overran stable phase with multi-phases in which single phases having respective merits are combined together with each other. Therefore, it is possible to predict in easy manner the physical properties of a new composite oxide prepared by adding any other component(s), and as a result, it is easy to improve or maximize any desired or elected properties of a ceramic material. This is another purpose of the present invention.

From the Examples and Table as shown above, it can be understood that, if a composite ceramic is prepared by selecting its components from metal oxides having resistance to acid and base, said composite ceramic can be used as a porous ceramic material having a structural, thermal and chemical stability higher than cordierite or silicon carbide (SiC) and having excellent properties which enable itself to serve as a catalyst carrier for the purification of automobile exhaust gas and as a filter for the purification of diesel engine exhaust gas.

As clearly shown in the above detailed description of the present invention, a new filter for the purification of exhaust gas can sufficiently be produced by means of changing the contents of materials components or adding new metal oxide selected from the metal oxides or combinations thereof described in the present invention. Further, by employing the process of the present invention, it is possible to produce a synthetic ceramic which is physically, thermally and chemically stable.

INDUSTRIAL APPLICABILITY

The ceramic materials according to the present invention have high structural, thermal and chemical stability and can be used as a carrier of a catalyst for the purification of automobile exhaust gas and as a filter for the purification of diesel engine exhaust gas.

What is claimed is:

1. A porous ceramic material formed in multi-phase and having good resistance to heat, acid and base, consisting essentially of:
   oxides of Si, Al, and Ti;
   wherein the oxides comprise SiO$_2$, Al$_2$O$_3$ and Ti$_x$O$_y$, wherein x represents an integer of 1 to 3, and y represents an integer of 1 to 3 as a (first component)-(second component)-(third component) in the weight ratio of (5-60): (5-60):(5-20).

2. The porous ceramic material according to claim 1, wherein said first component of silica (SiO$_2$) and said second component of alumina (Al$_2$O$_3$) constitute a composite oxide having the mullite structure (3Al$_2$O$_3$-2SiO$_2$).

3. The porous ceramic material according to claim 2, wherein said composite oxide having the mullite structure (3Al$_2$O$_3$-2SiO$_2$) and said third component of Ti$_x$O$_y$ are present in the weight ratio of (80-95):(5-20).

4. The porous ceramic material according to claim 3, wherein said composite oxide has the mullite structure (3Al$_2$O$_3$-2SiO$_2$), said third component of Ti$_x$O$_y$ is TiO$_2$, and said composite oxide and said third component are present in the weight ratio of (80-95):(5-20).

5. A porous honeycomb comprising a porous ceramic material formed in multi-phase and having good resistance to heat, acid and base, the porous ceramic material consisting essentially of:
   oxides of Si, Al, and Ti;
   wherein the oxides comprise SiO$_2$, Al$_2$O$_3$ and Ti$_x$O$_y$, wherein x represents an integer of 1 to 3, and y represents an integer of 1 to 3 as a (first component)-(second component)-(third component) in the weight ratio of (5-60): (5-60):(5-20).

6. A filter for the purification of diesel engine exhaust gas comprising a porous ceramic material formed in multi-phase and having good resistance to heat, acid and base, the porous ceramic material consisting essentially of:
   oxides of Si, Al, and Ti;
   wherein the oxides comprise SiO$_2$, Al$_2$O$_3$ and Ti$_x$O$_y$, wherein x represents an integer of 1 to 3, and y represents an integer of 1 to 3 as a (first component)-(second component)-(third component) in the weight ratio of (5-60): (5-60):(5-20).

7. A system for the purification of exhaust gas, which is manufactured by wash coating a porous carrier powder comprising a platinum, palladium or rhodium catalytic material onto a porous ceramic material formed in multi-phase and having good resistance to heat, acid and base, the porous ceramic material consisting essentially of:
   oxides of Si, Al, and Ti;

wherein the oxides comprise $SiO_2$, $Al_2O_3$ and $Ti_xO_y$, wherein x represents an integer of 1 to 3, and y represents an integer of 1 to 3 as a (first component)-(second component)-(third component) in the weight ratio of (5-60):(5-60):(5-20).

8. A system for the purification of exhaust gas, which is manufactured by loading a platinum, palladium or rhodium catalytic material onto a porous ceramic material formed in multi-phase and having good resistance to heat, acid and base, the porous ceramic material consisting essentially of:

oxides of Si, Al, and Ti;

wherein the oxides comprise $SiO_2$, $Al_2O_3$ and $Ti_xO_y$, wherein x represents an integer of 1 to 3, and y represents an integer of 1 to 3 as a (first component)-(second component)-(third component) in the weight ratio of (5-60):(5-60):(5-20).

9. A porous ceramic material formed in multi-phase and having good resistance to heat, acid and base, consisting essentially of:

oxides of Si, Al, Ti, and Zr;

wherein the oxides comprise $SiO_2$, $Al_2O_3$, $Ti_xO_y$ and $ZrO_2$ wherein x represents an integer of 1 to 3, and y represents an integer of 1 to 3 as a (first component)-(second component)-(third component)-(fourth component) in the weight ratio of (5-60):(5-60):(5-20):(5-60).

10. The porous ceramic material according to claim 9, wherein the first component of silica ($SiO_2$) and said second component of alumina ($Al_2O_3$) constitute a composite oxide having a mullite structure ($3Al_2O_3$-$2SiO_2$) and the third component of $Ti_xO_y$ and said fourth component of zirconia ($ZrO_2$) constitute a composite oxide of titania-zirconia ($TiZrO_4$).

* * * * *